Patented Sept. 1, 1931

1,821,035

UNITED STATES PATENT OFFICE

KARL SCHIRMACHER, OF FRANKFORT-ON-THE-MAIN-HOCHST, AND HANS SCHLICH-ENMAIER, OF BAD-SODEN-AM-TAUNUS, GERMANY, ASSIGNORS TO GENERAL ANILINE WORKS, INC., OF NEW YORK, N. Y., A CORPORATION OF DELAWARE

COMPOUNDS OF THE ANTHRACENE SERIES AND PROCESS OF PREPARING THEM

No Drawing. Application filed August 2, 1928, Serial No. 297,104, and in Germany August 18, 1927.

Our present invention relates to new compounds of the anthracene series and process of preparing them, more particularly to compounds of the following formula:

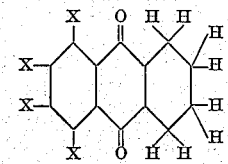

wherein X stands for hydrogen, halogen or the groups alkyl, amino, acylamino, alkylamino, aralkylamino, arylamino, hydroxyl, alkoxyl or nitro, but at least one X standing for a nitro group.

We have found that new compounds of the anthracene series are obtained by treating a 1.2.3.4-tetrahydroanthraquinone with a nitrating agent, advantageously with nitric acid in the presence of sulfuric acid at a temperature of between $-20°$ C. and $+80°$ C. It is a quite unexpected result that by this process no dehydrogenation occurs but that nitrotetrahydroanthraquinones are obtained containing the nitro groups in the aromatic nucleus.

Thus by starting from 1.2.3.4-tetrahydroanthraquinone itself a mixture is obtained consisting besides a small quantity of a $\beta$-nitro compound chiefly of the ar-$\alpha$-nitro-1.2.3.4-tetrahydroanthraquinone of the formula:

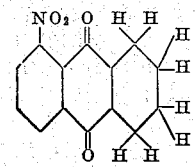

The nitro product obtained in a smaller quantity corresponds to the formula:

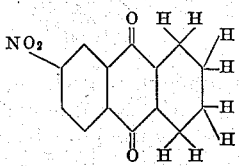

This results from the fact that the acetamino compound obtainable by reducing and acetylating the nitro product is identical with the compound obtainable by hydrogenating $\beta$-acetaminoanthraquinone which doubtless has the following constitution:

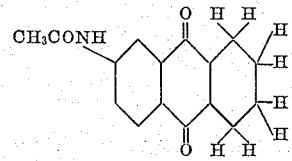

It is surprising that this nitration occurs in a smooth reaction, since, as experiments have shown, concentrated sulfuric acid alone has for instance a dehydrogenating action upon tetrahydroanthraquinones, whereas by the action of bromine derivatives are obtained containing the bromine in the hydrogenated nucleus and being very unstable. They easily split off hydrogen bromide and are transformed into the corresponding anthraquinones. Therefore, it was to be expected that nitric acid or a mixture of nitric acid and sulfuric acid would have at least the same dehydrogenating action as bromine or sulfuric acid.

The new compounds are intended to be used as starting materials for the manufacture of dyestuffs and pharmaceutical products.

The following examples are given by way of illustration, it being understood that they are in no way limitative:

(1) 110 parts by weight of 1.2.3.4-tetrahydroanthraquinone of the formula:

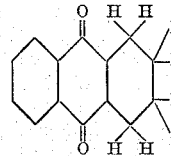

are introduced into a mixture of 500 parts by volume of sulfuric acid of 100 per cent strength and 60 parts by volume of nitric acid of 1.4 specific gravity at 20° C. in such a manner that the temperature rises to 40° C. to 50° C. and is maintained there. When all tetrahydroanthraquinone has been entered, the mass solidifies into a light yellow crystalline magma and is immediately placed on ice.

The light yellow reaction product which separates is filtered by suction and boiled out with alcohol. The residue which is by far the chief quantity is recrystallized from glacial acetic acid. It is obtained in the form of well-formed greenish-yellow crystals melting at 192° C. It dissolves in concentrated sulfuric acid to a reddish-yellow solution. By treating the crystals with caustic soda solution and hydrosulfite a reddish-yellow solution is obtained, the nitro group being reduced. They are very sparingly soluble in water and alcohol, rather readily soluble in glacial acetic acid. As already stated in the introductory paragraph, the product is the nitro derivative of the following constitution:

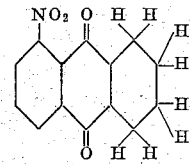

On allowing the alcoholic mother lye to cool, there crystallizes from it the isomeric β-compound of the formula:

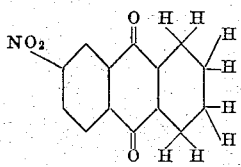

which by recrystallization from petroleum ether, if necessary with the addition of a small quantity of animal charcoal, is obtained in the form of faintly yellow colored crystals. It dissolves in concentrated sulfuric acid to a feably yellow, in caustic soda solution and hydrosulfite to a reddish-yellow solution. It melts at 133° C. to 134° C. and is rather soluble in hot alcohol.

(2) Into a solution of 22.6 parts by weight of 1.2.3.4-tetrahydro-7-methylanthraquinone of the formula:

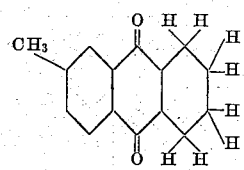

in 150 parts by volume of sulfuric acid are run in drop by drop at 40° C. to 50° C. 12 parts by volume of nitric acid of 1.4 specific gravity. When all acid has been run in, the product of the reaction is poured on ice, filtered by suction and crystallized from alcohol. It forms yellow crystals melting at 130° C. and dissolving in concentrated sulfuric acid to a yellowish-red solution. The color of the solution in caustic soda solution and hydrosulfite is yellowish-red. The compound is rather soluble in alcohol and glacial acetic acid, very readily soluble in xylene. It probably has the following constitution:

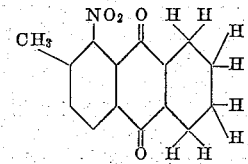

(3) 26.9 parts by weight of 1.2.3.4-tetrahydro-8-acetylaminoanthraquinone of the formula:

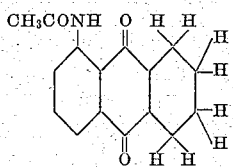

(obtainable by reducing and acetylating the 1.2.3.4-tetrahydro-8-nitroanthraquinone prepared in the manner indicated in the first paragraph of Example 1) are entered at −5° C. into a mixture of 200 parts by volume of monohydrate and 10 parts by volume of nitric acid of the specific gravity 1.4 and the reaction mixture is poured on ice. The precipitate is filtered by suction, freed from red by-products by boiling it with alcohol and recrystallized from glacial acetic acid. Thus orange-colored crystals are obtained decomposing at 185° C. and dissolving in concentrated sulfuric acid to an almost colorless solution. The compound has probably the following constitution:

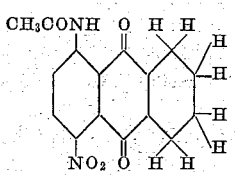

We claim:

1. The process of preparing nitro compounds of 1.2.3.4-tetrahydroanthraquinones containing the nitro groups in the non-hydrogenated nucleus which consists in treating a 1.2.3.4-tetrahydroanthraquinone of the general formula:

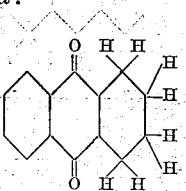

the aromatic nucleus may be substituted in any manner, but at least one carbon atom of which must be occupied by hydrogen, with nitric acid.

2. The process of preparing nitro compounds of 1.2.3.4-tetrahydroanthraquinones containing the nitro groups in the non-hydrogenated nucleus which consists in treating a 1.2.3.4-tetrahydroanthraquinone of the general formula:

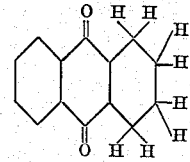

wherein the aromatic nucleus may be substituted in any manner, but at least one carbon atom of which must be occupied by hydrogen, with nitric acid, in the presence of sulfuric acid.

3. The process of preparing nitro compounds of 1.2.3.4-tetrahydroanthraquinones containing the nitro groups in the non-hydrogenated nucleus which consists in treating a 1.2.3.4-tetrahydroanthraquinone of the general formula:

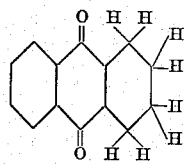

wherein the aromatic nucleus may be substituted in any manner, but at least one carbon atom of which must be occupied by hydrogen, with nitric acid of specific gravity 1.4 in the presence of concentrated sulfuric acid at a temperature of between −20° C. and +80° C.

4. As new products, compounds of the following general formula:

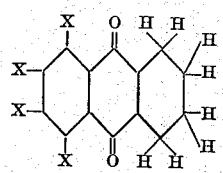

wherein X stands for hydrogen, halogen or for the groups alkyl, amino, acylamino, alkylamino, aralkylamino, arylamino, hydroxyl, alkoxyl or nitro and wherein at least one X stands for a nitro group.

5. As new products, compounds of the following formula:

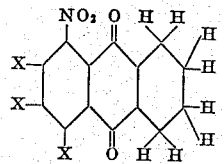

wherein X stands for hydrogen, halogen or for the groups alkyl, amino, acylamino, alkylamino, aralkylamino, arylamino, hydroxyl, alkoxyl or nitro.

6. As new products, compounds of the following formula:

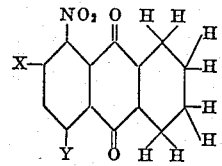

wherein X stands for hydrogen or alkyl and Y for hydrogen, the amino group or acylamino group.

7. As new products, compounds of the following formula:

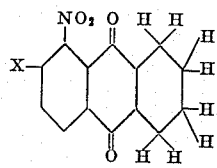

wherein X stands for hydrogen or methyl.

8. As a new product, 1.2.3.4-tetrahydro-8-nitroanthraquinone of the formula:

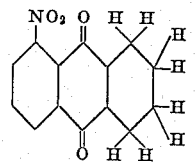

forming yellow crystals and dissolving in concentrated sulfuric acid to a reddish-yellow solution.

9. As a new product, 1.2.3.4-tetrahydro-6-nitro-8-acetyl-aminoanthraquinone of the formula

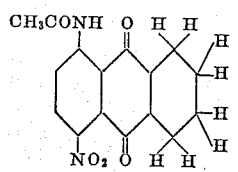

forming orange colored crystals and dissolving in concentrated sulfuric acid to an almost colorless solution.

In testimony whereof, we affix our signatures.

KARL SCHIRMACHER.
HANS SCHLICHENMAIER.